United States Patent
Hanawa

(10) Patent No.: US 11,807,755 B2
(45) Date of Patent: Nov. 7, 2023

(54) POLYMERIZABLE COMPOSITION FOR OPTICAL MATERIAL, MOLDED PRODUCT, OPTICAL MATERIAL, PLASTIC LENS, AND LAMINATED PLASTIC LENS

(71) Applicant: MITSUI CHEMICALS, INC., Tokyo (JP)

(72) Inventor: Takayuki Hanawa, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 615 days.

(21) Appl. No.: 16/828,181

(22) Filed: Mar. 24, 2020

(65) Prior Publication Data

US 2020/0308400 A1     Oct. 1, 2020

(30) Foreign Application Priority Data

Mar. 29, 2019   (JP) ................. 2019-066042

(51) Int. Cl.
| | | |
|---|---|---|
| C08L 75/04 | (2006.01) | |
| C08G 18/75 | (2006.01) | |
| C08G 18/32 | (2006.01) | |
| C08G 18/52 | (2006.01) | |
| G02B 1/115 | (2015.01) | |
| G02B 1/14 | (2015.01) | |
| G02B 1/04 | (2006.01) | |

(52) U.S. Cl.
CPC .......... *C08L 75/04* (2013.01); *C08G 18/3206* (2013.01); *C08G 18/52* (2013.01); *C08G 18/753* (2013.01); *G02B 1/041* (2013.01); *G02B 1/115* (2013.01); *G02B 1/14* (2015.01)

(58) Field of Classification Search
CPC .. C08G 18/757; C08G 18/66; C08G 18/6603; C08G 18/3876; C08G 18/10; G02B 1/041; C08L 75/04; C08L 81/00
See application file for complete search history.

(56) References Cited

U.S. PATENT DOCUMENTS

| | | | | |
|---|---|---|---|---|
| 11,180,602 B2 * | 11/2021 | Ryu | ................... | C08G 18/3855 |
| 2009/0099329 A1 * | 4/2009 | Ryu | ................... | C08G 18/3876 |
| | | | | 528/60 |
| 2009/0227745 A1 * | 9/2009 | Kohgo | ................. | C08G 18/757 |
| | | | | 525/453 |
| 2010/0216905 A1 * | 8/2010 | Kuwamura | ........ | C08G 18/6674 |
| | | | | 528/65 |
| 2015/0346387 A1 * | 12/2015 | Yamasaki | .......... | C08G 18/3275 |
| | | | | 528/85 |

FOREIGN PATENT DOCUMENTS

JP     2014055229 A     3/2014

OTHER PUBLICATIONS

Rahmawati et al., "Microphase-separated structure and mechanical properties of cycloaliphatic diisocyanate-based thiourethane elastomers", Polymer Journal, 2019, vol. 51, pp. 265-273. (cited in Office Action dated Aug. 22, 2023, by the Japanese Patent Office in corresponding Japanese Patent Application No. 2020-052821).

* cited by examiner

*Primary Examiner* — Michael M Dollinger
(74) *Attorney, Agent, or Firm* — BUCHANAN, INGERSOLL & ROONEY PC

(57) ABSTRACT

Provided is a polymerizable composition for an optical material including: a polyisocyanate component which includes 1,4-bis(isocyanatomethyl)cyclohexane; a polyol component which includes a diol compound having a molecular weight of 400 or more and having two or more hydroxyl groups; and a polythiol component which includes a polythiol compound having two or more mercapto groups.

12 Claims, No Drawings

POLYMERIZABLE COMPOSITION FOR OPTICAL MATERIAL, MOLDED PRODUCT, OPTICAL MATERIAL, PLASTIC LENS, AND LAMINATED PLASTIC LENS

BACKGROUND

Technical Field

The present invention relates to a polymerizable composition for a high refractive index and high strength material having transparency. More specifically, the present invention relates to a polymerizable composition for an optical material, as well as a molded product, an optical material, a plastic lens, and a laminated plastic lens which are produced from the composition.

Related Art

A raw material used as an optical material was mainly glass from old times, but a variety of plastics for optical materials have been developed in recent years, and are widely used as an alternative for the glass. As the optical material such as spectacle lenses, plastic materials such as an acrylic resin, an aliphatic carbonate resin, a polycarbonate, and a polyurethane are mainly used since the plastic materials have excellent optical properties, are lightweight and hard to break, and have excellent formability.

Among them, a polyurethane resin is used as a useful polymer for producing the optical material since the polyurethane resin has good optical properties such as refractive index and mechanical properties such as impact resistance. In addition, physical properties of the polyurethane resin can be controlled by selecting types and blending proportion of a polyisocyanate and a polyol, which are raw material polymers of the polyurethane resin. Therefore, the polyurethane resin is used, for example, as a molding material in a method for molding processing of a thermoplastic resin, such as extrusion molding and injection molding, and the obtained molded products are widely applied in various industrial fields.

For example, Japanese Laid-open Patent Publication No. 2014-55229 discloses that a thermosetting polyurethane resin, which is produced by using at a predetermined formulation of 1,4-bis(isocyanatomethyl)cyclohexane as a polyisocyanate and an active hydrogen compound having a molecular weight of 200 or more and less than 400 and an active hydrogen compound having a molecular weight of 80 or more and less than 200 as a polyol or a polythiol, has excellent properties such as hardness, transparency, and heat resistance.

SUMMARY

The present inventor has found that the polyurethane resin of Japanese Laid-open Patent Publication No. 2014-55229 has room for improvement in impact resistance.

The present invention has been made in view of the above-mentioned problems, and an object of the present invention is to provide a polymerizable composition which can produce a poly(thio)urethane resin having transparency and high impact resistance.

That is, the present invention can be described as follows.

[1] A polymerizable composition for an optical material, including:
a polyisocyanate component which includes 1,4-bis(isocyanatomethyl)cyclohexane;
a polyol component which includes a diol compound having a molecular weight of 400 or more and having two hydroxyl groups; and
a polythiol component which includes a dithiol compound having two mercapto groups.

[2] The polymerizable composition for an optical material according to [1],
in which the diol compound having a molecular weight of 400 or more and having two hydroxyl groups includes a polyether diol.

[3] The polymerizable composition for an optical material according to [2],
in which the polyether diol includes polytetramethylene ether glycol.

[4] The polymerizable composition for an optical material according to [1],
in which the 1,4-bis(isocyanatomethyl)cyclohexane contains a trans-isomer at a proportion of 80 mol % to 93 mol %.

[5] The polymerizable composition for an optical material according to [1],
in which the polyisocyanate component further includes an aromatic polyisocyanate compound having two or more isocyanato groups.

[6] The polymerizable composition for an optical material according to [5],
in which the aromatic polyisocyanate compound includes at least one selected from the group consisting of 4,4'-diphenylmethane diisocyanate, 2,4'-diphenylmethane diisocyanate, and 2,2'-diphenylmethane diisocyanate.

[7] The polymerizable composition for an optical material according to [1],
in which the dithiol compound includes at least one selected from the group consisting of 1,3-propane dithiol and bis(2-mercaptoethyl) sulfide.

[8] The polymerizable composition for an optical material according to [1],
in which the polyisocyanate component and the polyol component form a prepolymer.

[9] A molded product formed of a cured product of the polymerizable composition for an optical material according to [1].

[10] An optical material formed of the molded product according to [9].

[11] A plastic lens formed of the molded product according to [9].

[12] A laminated plastic lens including:
the plastic lens according to [11]; and
a hard coat layer and an anti-reflective coating layer which are provided on at least one surface of the plastic lens.

According to the present invention, a polymerizable resin composition of which a cured product has transparency and excellent impact resistance, and which can be suitably used as an optical material is provided.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

A description will be given of the polymerizable composition for an optical material of the present invention and the use thereof based on the following embodiments.

(Polymerizable composition for optical material) A polymerizable composition for an optical material (hereinafter, also simply referred to as a "polymerizable composition") of the present embodiment includes a polyisocyanate component (A) which includes 1,4-bis(isocyanatomethyl)cyclohexane, a polyol component (B) which includes a diol compound having a molecular weight of 400 or more and having two hydroxyl groups, and a polythiol component (C) which includes a dithiol compound having two mercapto groups.

Since the polymerizable composition of the present embodiment includes a combination of the above-mentioned specific polyisocyanate component (A), polyol component (B), and polythiol component (C), a cured product of the polymerizable composition has improved impact resistance and transparency as compared with polymerizable compositions in the related art. More specifically, the present inventor has found that, by using an active hydrogen compound having a molecular weight of less than 400, the polymerizable compositions in the related art as disclosed in Japanese Laid-open Patent Publication No. 2014-55229 can be improved in transparency of an obtained resin, but the resin has room for improvement in impact resistance. By using the active hydrogen compound having a molecular weight of more than 400, an improvement in impact resistance can be expected, but in a case of using the high molecular weight of active hydrogen compound, the obtained resin may be whitened. The present inventor has found that, by using the above-mentioned specific components in combination, it is possible to improve impact resistance while suppressing whitening of the obtained resin, and has completed the present invention.

Hereinafter, each component will be described.

<Polyisocyanate Component (A)>

The polyisocyanate component (A) used in the polymerizable composition of the present embodiment includes 1,4-bis(isocyanatomethyl)cyclohexane.

1,4-bis(isocyanatomethyl)cyclohexane includes stereoisomers of cis-1,4-bis(isocyanatomethyl)cyclohexane (hereinafter, referred to as a "cis-1,4-isomer") and trans-1,4-bis(isocyanatomethyl)cyclohexane (hereinafter, referred to as a "trans-1,4-isomer"). In one embodiment, the trans-1,4-isomer is in an amount of, for example, 70 mol % or more, preferably 80 mol % or more, and more preferably 85 mol % or more, and in an amount of, for example, 99 mol % or less, preferably 97 mol % or less, and more preferably 93 mol % or less with respect to the whole 1,4-bis(isocyanatomethyl)cyclohexane to be used.

In a case where the content proportion of the trans-1,4-isomer is the above-mentioned lower limit or more, an obtained cured product of a polymerizable composition has excellent heat resistance and impact resistance. In addition, in a case where the content proportion of the trans-1,4-isomer is the above-mentioned upper limit or less, an obtained cured product of the polymerizable composition has transparency.

1,4-bis(isocyanatomethyl)cyclohexane can be produced, for example, by a cool and heat two-stage method (direct method) or a salt-forming method disclosed in Japanese Laid-open Patent Publication No. 1995-309827 (H07-309827), a non-phosgene method disclosed in Japanese Laid-open Patent Publication No. 2004-244349 or Japanese Laid-open Patent Publication No. 2003-212835, or the like by using, for example, a commercially available amine, an amine obtained by a method disclosed in Japanese Laid-open Patent Publication No. 2011-6382, or the like.

In addition, 1,4-bis(isocyanatomethyl)cyclohexane may be in a form of modified product as long as the effects of the present invention are not impaired.

Examples of the modified product of 1,4-bis(isocyanatomethyl)cyclohexane include multimers of 1,4-bis(isocyanatomethyl)cyclohexane (such as dimers (for example, a modified uretidione and the like) and trimers (for example, a modified isocyanurate, a modified imino oxadiazine dione, and the like)), modified biurets (such as a modified biuret obtained by a reaction of 1,4-bis(isocyanatomethyl)cyclohexane and water), modified allophanates (such as a modified allophanate obtained by a reaction of 1,4-bis(isocyanatomethyl)cyclohexane and a monool or a low molecular weight polyol), modified polyols (such as a modified polyol obtained by a reaction of 1,4-bis(isocyanatomethyl)cyclohexane and a low molecular weight polyol or a high molecular weight polyol), modified oxadiazine triones (such as modified oxadiazine trione obtained by a reaction of 1,4-bis(isocyanatomethyl)cyclohexane and carbon dioxide gas), and modified carbodiimides (such as a modified carbodiimide obtained by a decarboxylation-condensation reaction of 1,4-bis(isocyanatomethyl)cyclohexane).

The polyisocyanate component (A) used in the polymerizable resin composition of the present embodiment may include other polyisocyanate compounds. Examples of the other polyisocyanate compounds include aromatic polyisocyanates, araliphatic polyisocyanates and aliphatic polyisocyanates. Among them, since impact resistance and transparency of an obtained cured product of the polymerizable composition are improved, the polyisocyanate component (A) preferably includes an aromatic polyisocyanate or an araliphatic polyisocyanate.

As the aromatic polyisocyanate, an aromatic polyisocyanate having two or more isocyanato groups is preferable. Examples of the aromatic polyisocyanate having two or more isocyanato groups include 2,4-toluene diisocyanate, 2,6-toluene diisocyanate, and an isomer mixture thereof (TDI), 4,4'-diphenylmethane diisocyanate, 2,4'-diphenylmethane diisocyanate, 2,2'-diphenylmethane diisocyanate, and an isomer mixture thereof (MDI), toluidine diisocyanate (TODI), p-phenylene diisocyanate, and naphthalene diisocyanate (NDI).

Among them, at least one selected from the group consisting of 4,4'-diphenylmethane diisocyanate, 2,4'-diphenylmethane diisocyanate, and 2,2'-diphenylmethane diisocyanate is preferably used as the aromatic polyisocyanate. By using the aromatic polyisocyanate, an obtained cured product of the polymerizable composition has improved transparency, impact resistance, and heat resistance in excellent balance with maintaining high refractive index.

As the araliphatic polyisocyanate, an araliphatic polyisocyanate having two or more isocyanato groups is preferable. Examples of the araliphatic polyisocyanate having two or more isocyanato groups include 1,3-xylylene diisocyanate and 1,4-xylylene diisocyanate, as well as an isomer mixture thereof (XDI), 1,3-tetramethylxylylene diisocyanate and 1,4-tetramethylxylylene diisocyanate, as well as an isomer mixture thereof (TMXDI). By using the araliphatic polyisocyanate, an obtained cured product of the polymerizable composition has improved transparency, impact resistance, and heat resistance in excellent balance with maintaining high refractive index.

Examples of the aliphatic polyisocyanate which can be used as the polyisocyanate component (A) include ethylene diisocyanate, trimethylene diisocyanate, tetramethylene diisocyanate, pentamethylene diisocyanate (PDI), hexamethylene diisocyanate (HDI), octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanatomethyl octane, 2,5,7-trimethyl-1,8-diisocyanate-5-isocyanatomethyl octane, bis(isocyanatoethyl) carbonate, bis(isocyanatoethyl) ether, 1,4-butylene glycol dipropyl ether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanate-n-butylidene)pentaerythritol, and 2,6-diisocyanatomethylcaproate.

In addition, the aliphatic polyisocyanate can include an alicyclic polyisocyanate (other than 1,4-bis(isocyanatomethyl)cyclohexane).

Examples of the alicyclic polyisocyanate (other than 1,4-bis(isocyanatomethyl)cyclohexane) include isophorone diisocyanate, 1,3-bis(isocyanatomethyl)cyclohexane, trans-trans-, trans-cis- and cis-cis-dicyclohexylmethane diisocyanate and a mixture thereof (hydrogenated MDI), 1,3- or 1,4-cyclohexane diisocyanate and a mixture thereof, 1,3- or 1,4-bis(isocyanatoethyl)cyclohexane, methylcyclohexane diisocyanate, 2,2'-dimethyldicyclohexylmethane diisocyanate, dimer acid diisocyanate, 2,5-diisocyanatomethylbicyclo[2.2.1]-heptane, 2,6-diisocyanatomethylbicyclo[2.2.1]-heptane (NBDI), 2-isocyanatomethyl-2-(3-isocyanatopropyl)-5-isocyanatomethylbicyclo-[2.2.1]-heptane, 2-isocyanatomethyl-2-(3-isocyanatopropyl)-6-isocyanatomethylbicyclo-[2.2.1]-heptane, 2-isocyanatomethyl-3-(3-isocyanatopropyl)-5-(2-isocyanatoethyl)-bicyclo-[2.2.1]-heptane, 2-isocyanatomethyl-3-(3-isocyanatopropyl)-6-(2-isocyanatoethyl)-bicyclo-[2.2.1]-heptane, 2-isocyanatomethyl-2-(3-isocyanatopropyl)-5-(2-isocyanatoethyl)-bicyclo-[2.2.1]-heptane, and 2-isocyanatomethyl-2-(3-isocyanatopropyl)-6-(2-isocyanatoethyl)-bicyclo-[2.2.1]-heptane.

In a case where the polyisocyanate component (A) includes the above-mentioned other polyisocyanate compounds in addition to 1,4-bis(isocyanatomethyl)cyclohexane, the amount of 1,4-bis(isocyanatomethyl)cyclohexane is, for example, 20 mol % or more, preferably 30 mol % or more, and more preferably 35 mol % or more, and for example, 90 mol % or less, preferably 80 mol % or less, and more preferably 70 mol % or less with respect to the whole polyisocyanate component (A).

In a case where the content proportion of 1,4-bis(isocyanatomethyl)cyclohexane is within the above-mentioned range, the obtained cured product of the polymerizable composition can have excellent heat resistance, impact resistance, and transparency.

In a case where the polyisocyanate component (A) includes the above-mentioned aromatic polyisocyanate compound and/or the araliphatic polyisocyanate compound as the above-mentioned other polyisocyanate compound, the amount of these aromatic polyisocyanate compound and/or araliphatic polyisocyanate compound is, for example, 5 mol % or more, preferably 10 mol % or more, and more preferably 20 mol % or more, and for example, 60 mol % or less, preferably 50 mol % or less, and more preferably 40 mol % or less with respect to the whole polyisocyanate component (A).

In a case where the content proportion of the aromatic polyisocyanate compound and/or araliphatic polyisocyanate compound is within the above-mentioned range, the obtained cured product of the polymerizable composition can have excellent heat resistance, impact resistance, and transparency.

<Polyol Component (B)>

The polyol component (B) used in the polymerizable composition of the present embodiment includes a diol compound having a molecular weight of 400 or more and having two hydroxyl groups. By using a diol compound having a molecular weight of 400 or more, the obtained cured product of the polymerizable composition has excellent impact resistance.

Here, the "molecular weight of the polyol component (B)" used in the present specification refers to a number-average molecular weight Mn calculated based on a hydroxyl value (OHV) (mgKOH/g) of the polyol component (B). The hydroxyl value (OHV) (mgKOH/g) refers to the number of mg of potassium hydroxide equivalent to a hydroxyl group contained in 1 g of a polyol.

For example, in a case where a hydroxyl value of a polydiol having a molecular weight of M is 112 (mgKOH/g), the molecular weight M is obtained as follows.

Hydroxyl value (OHV) of polydiol=112 (mgKOH/g)
Number of moles of OH group in 1 g of polydiol=112 (mgKOH/g)/56.1 (molecular weight of KOH)=$1.9964 \times 10^{-3}$ mol/g
Number of moles of diol molecule (HO—R—OH) in 1 g of polydiol=$1.9964 \times 10^{-3}$ (mol/g)/2 (mol/g)

That is, since $1.9964 \times 10^{-3}/2$ (mol) of the polydiol having a number-average molecular weight of Mn is present in 1 g of the polydiol, the molecular weight M of the polydiol as a mass (g) of the polydiol per 1 mol of the polydiol is obtained as follows:

$$M \text{ (molecular weight)} = 1 \text{ (g)}/(1.9964 \times 10^{-3}/2) \text{ (mol)}$$

$$M = 1002.$$

Examples of the diol compound used in the present embodiment include a polyether diol, a polyester diol, a polycarbonate diol, a vegetable oil diol, a polyolefin diol, an acrylic diol, and a vinyl monomer-modified diol, all of which have a molecular weight of 400 or more. Among them, examples of the diol compound include a polyether diol. The diol compounds may be used alone or in combination of two or more thereof.

The lower limit value of the molecular weight of the diol compound used in the present embodiment is 400 or more, and preferably 450 or more and more preferably 500 or more. The upper limit value of the molecular weight of the polyol compound used in the present embodiment is, for example, 2000 or less, and preferably 1800 or less and more preferably 1600 or less. In a case where the molecular weight of the polyol compound is within the above-mentioned range, an obtained cured product of the resin composition can be improved in impact resistance without impairing transparency.

Examples of the polyether diol include a polyoxyalkylene glycol and polytetramethylene ether glycol.

The polyoxyalkylene glycol is, for example, an addition polymer of an alkylene oxide.

Examples of the alkylene oxide include propylene oxide, ethylene oxide, butylene oxide, and styrene oxide. In addition, the alkylene oxides may be used alone or in combination of two or more thereof. In addition, among them, preferred examples of the alkylene oxide include propylene oxide, ethylene oxide, and butylene oxide. A polyoxyalkylene glycole includes, for example, a random and/or block copolymer of propylene oxide and an alkylene oxide such as ethylene oxide.

Examples of the polyester diol include a polycondensate obtained by reacting a low molecular weight diol (such as ethylene glycol, propylene glycol, 1,3-propane diol, and bisphenol A) with a polybasic acid.

Examples of the polybasic acid include saturated aliphatic dicarboxylic acids (C11 to C13) such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid; unsaturated aliphatic dicarboxylic acids such as maleic acid, fumaric acid, and itaconic acid; aromatic dicarboxylic acids such as orthophthalic acid, isophthalic acid, terephthalic acid, toluenedicarboxylic acid, and naphthalenedicarboxylic acid; alicyclic dicarboxylic acids such as hexahydrophthalic acid; carboxylic acids such as a dimer acid, a hydrogenated dimer acid, and HET acid; acid anhydrides derived from these carboxylic acids (such as oxalic anhydride, succinic anhydride, maleic anhydride, phthalic anhydride, 2-alkyl (C12 to C18) succinic anhydride, tetrahydrophthalic anhydride, and trimellitic anhydride); and acid halides derived from these carboxylic acids (such as oxalic acid dichloride, adipic acid dichloride, and sebacic acid dichloride).

Other examples of the polyester diol include a polyester diol derived from plant, specifically, a vegetable oil-based polyester diol obtained by a condensation reaction of a hydroxycarboxylic acid such as a hydroxyl group-containing vegetable oil fatty acid (for example, a castor oil fatty acid containing ricinoleic acid, a hydrogenated castor oil fatty acid containing 12-hydroxystearic acid, and the like) using the above-mentioned low molecular weight diol as an initiator.

Examples of the polyester diol include a polycaprolactone diol or a polyvalerolactone diol which is obtained by, using the above-mentioned low molecular weight diol as an initiator, a ring-opening polymerization of lactones such as ε-caprolactone or γ-valerolactone or lactides such as L-lactide or D-lactide, or a lactone-based polyester diol obtained by copolymerizing a dihydric alcohol with the lactones or lactides.

Examples of the polycarbonate diol include a product of ring-opening polymerization of ethylene carbonate using the above-mentioned low molecular weight diol as an initiator, or an amorphous polycarbonate diol obtained by copolymerizing a dihydric alcohol, for example, 1,4-butanediol, 1,5-pentanediol, 3-methyl-1,5-pentanediol, or 1,6-hexanediol, and the like, with a product of ring-opening polymerization.

Examples of the vegetable oil diol include a hydroxyl group-containing vegetable oil such as castor oil and coconut oil. More specifically, examples of the vegetable oil diol include a castor oil diol, or an ester-modified castor oil diol obtained by reacting a castor oil fatty acid with polypropylene glycol.

Examples of the polyolefin diol include polybutadiene glycol and a partially saponified ethylene-vinyl acetate copolymer.

Examples of the acrylic diol include a copolymer obtained by copolymerizing a hydroxyl group-containing acrylate with a copolymerizable vinyl monomer which can copolymerize with the hydroxyl group-containing acrylate.

Examples of the hydroxyl group-containing acrylate include 2-hydroxyethyl (meth)acrylate, hydroxypropyl (meth)acrylate, hydroxybutyl (meth)acrylate, 2,2-dihydroxymethylbutyl (meth)acrylate, a polyhydroxyalkyl maleate, and a polyhydroxyalkyl fumarate. Preferred examples thereof include 2-hydroxyethyl (meth)acrylate.

Examples of the copolymerizable vinyl monomer include alkyl (meth)acrylates (carbon number: 1 to 12) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, isononyl (meth)acrylate, 2-ethylhexyl (meth)acrylate, and cyclohexyl acrylate; aromatic vinyls such as styrene, vinyltoluene, and α-methylstyrene; vinyl cyanides such as (meth)acrylonitrile; vinyl monomers having a carboxyl group such as (meth)acrylic acid, fumaric acid, maleic acid, and itaconic acid, or alkyl esters thereof; alkane polyol poly(meth)acrylates such as ethylene glycol di(meth)acrylate, butylene glycol di(meth)acrylate, hexanediol di(meth)acrylate, and oligoethylene glycol di(meth)acrylate; and vinyl monomers having an isocyanate group such as 3-(2-isocyanate-2-propyl)-α-methylstyrene.

The acrylic diol can be obtained by copolymerizing the hydroxyl group-containing acrylate with the copolymerizable vinyl monomer in the presence of a suitable solvent and polymerization initiator.

The vinyl monomer-modified diol can be obtained by reacting a high molecular weight diol with a vinyl monomer.

As a preferred embodiment, a polytetramethylene ether glycol having a molecular weight of 400 or more is used as the diol compound. By using the polytetramethylene ether polyol, the obtained cured product of the polymerizable composition can have excellent impact resistance.

The polyol component (B) used in the present embodiment may include other polyol compounds, in addition to the above-mentioned diol compound having a molecular weight of 400 or more, as long as the effects of the present invention are not impaired. Examples of the other polyol compounds which can be used include a diol compound having a molecular weight of less than 400, and a polyol having three or more hydroxyl group.

Examples of the diol compound having a molecular weight of less than 400 include a diol compound having a molecular weight of less than 400, preferably less than 350 and more preferably less than 300, and particularly include a polyether diol, a polyester diol, a polycarbonate diol, a polyolefin diol, an acrylic diol, and a vinyl monomer-modified diol, all of which have a molecular weight of less than 400. The lower limit value of the molecular weight of the diol compound is, for example, 80 or more and preferably 100 or more. Among them, it is preferable to use a polyether diol. By using the diol compound having a molecular weight of less than 400, the obtained cured product of the polymerizable composition can have excellent transparency.

In a case where the polyol component (B) includes a diol compound having a molecular weight of 400 or more and a diol compound having a molecular weight of less than 400, the diol compound having a molecular weight of less than 400 is in an amount of, for example, 10 mol % to 90 mol % with respect to the diol compound having a molecular weight of 400 or more.

Examples of the polyol having three or more hydroxyl groups include a tri- or more functional polyether polyol, polyester polyol, and polycarbonate polyol.

<Polythiol Component (C)>

The polythiol component (C) used in the polymerizable composition of the present embodiment includes a dithiol compound having two mercapto groups.

Examples of the dithiol compound used in the present embodiment include an aliphatic dithiol, an aromatic dithiol, a heterocyclic-containing dithiol, an aliphatic dithiol containing a sulfur atom other than a mercapto group, an aromatic dithiol containing a sulfur atom other than a mercapto group, and a heterocyclic-containing dithiol containing a sulfur atom other than a mercapto group.

Examples of the aliphatic dithiol include methanedithiol, 1,2-ethanedithiol, 1,1-propanedithiol, 1,2-propanedithiol, 1,3-propanedithiol, 2,2-propanedithiol, 1,6-hexanedithiol, 1,1-cyclohexanedithiol, 1,2-cyclohexanedithiol, 2,2-dimethylpropane-1,3-dithiol, 3,4-dimethoxybutane-1,2-dithiol, 1-methylcyclohexane-2,3-dithiol, 1,1-bis(mercaptomethyl)cyclohexane, 1,2-dimercaptopropylmethylether, 2,3-dimercaptopropylmethylether, bis(2-mercaptoethyl) ether, thiomalic acid bis(2-mercaptoethylester), 2,3-dimercaptosuccinic acid (2-mercaptoethylester), 2,3-dimercapto-1-propanol (2-mercaptoacetate), 2,3-dimercapto-1-propanol (3-mercaptopropionate), diethylene glycol bis(2-mercaptoacetate), diethylene glycol bis(3-mercaptopropionate), 2,2-bis(mercaptomethyl)-1,3-propanedithiol, ethylene glycol bis(2-mercaptoacetate), ethylene glycol bis(3-mercaptopropionate), butanediol bis(2-mercaptoglycolate), butanediol bis(3-mercaptopropionate), tetraethylene glycol bis(3-mercaptopropionate), trimethylolpropane bis(2-mercaptoacetate), and trimethylolpropane bis(3-mercaptopropionate).

Examples of the aromatic dithiol include 1,2-dimercaptobenzene, 1,3-dimercaptobenzene, 1,4-dimercaptobenzene, 1,2-bis(mercaptomethyl)benzene, and 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, phenylmethane-1,1-dithiol, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 2,2'-dimercaptobiphenyl, 4,4'-dimercaptobiphenyl, 4,4'-dimercaptobibenzyl, 9,10-anthracene dimethanethiol, 1,3-di(p-methoxyphenyl)propane-2,2-dithiol, 1,3-diphenylpropane-2,2-dithiol, and 2,4-di(p-mercaptophenyl) pentane.

Examples of the heterocyclic-containing dithiol include 2-methylamino-4,6-dithiol-sym-triazine, 2-ethylamino-4,6-dithiol-sym-triazine, 2-amino-4,6-dithiol-sym-triazine, 2-methoxy-4,6-dithiol-sym-triazine, 2-morpholino-4,6-dithiol-sym-triazine, 2-cyclohexylamino-4,6-dithiol-sym-triazine, 2-phenoxy-4,6-dithiol-sym-triazine, 2-thiobenzeneoxy-4,6-dithiol-sym-triazine, and 2-thiobutyloxy-4,6-dithiol-sym-triazine.

Examples of the aliphatic dithiol containing a sulfur atom other than a mercapto group include bis(mercaptomethyl) sulfide, bis(2-mercaptoethyl) sulfide, bis(mercaptomethylthio)methane, bis(2-mercaptoethylthio)methane, 1,2-bis(mercaptomethylthio)ethane, 2,5-dimercapto-1,4-dithiane, bis(mercaptomethyl)disulfide, bis(mercaptoethyl) disulfide, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 4,6-bis(mercaptomethylthio)-1,3-dithiane, 2-(2,2-bis(mercaptomethylthio)ethyl)-1,3-dithiethane, bis(mercaptopropyl) disulfide, an ester of thioglycolic acids and mercaptopropionic acids thereof, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,2-bis[(2-mercaptoethyl)thio]-3-mercaptopropane, 1,4-dithiane-2,5-diol bis(2-mercaptoacetate), 1,4-dithiane-2,5-diol bis(3-mercaptopropionate), thioglycolic acid bis(2-mercaptoethylester), thiodipropionic acid bis(2-mercaptoethylester), 4,4-thiodibutyric acid bis(2-mercaptoethylester), dithiodiglycolic acid bis(2-mercaptoethylester), dithiodipropionic acid bis(2-mercaptoethylester), and 4,4-dithiodibutyric acid bis(2-mercaptoethylester).

Examples of the aromatic dithiol containing a sulfur atom other than a mercapto group include 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, and 1,4-bis(mercaptoethylthio)benzene.

Examples of the heterocyclic-containing dithiol containing a sulfur atom other than a mercapto group include 3,4-thiophenedithiol and 2,5-dimercapto-1,3,4-thiadiazole.

The dithiol compounds may be used alone or in combination of two or more thereof. From the viewpoints of impact resistance and transparency of the obtained cured product of the polymerizable composition, at least one selected from the group consisting of 1,3-propane dithiol, bis(2-mercaptoethyl) sulfide, ethylene glycol bis(3-mercaptopropionate), 2,5-dimecaptomethyl-1,4-dithiane, 4,6-bis(mercaptomethylthio)-1,3-dithiane, and 2-(2,2-bis(mercaptomethylthio)ethyl)-1,3-dithietane is preferably used as the dithiol compound. Furthermore, from the viewpoint of refractive index of the cured product of the polymerizable composition, at least one selected from the group consisting of 1,3-propane dithiol and bis(2-mercaptoethyl) sulfide is preferably used.

The polythiol component (C) used in the polymerizable composition of the present embodiment may include a trivalent or tetravalent thiol compound, in addition to the above-mentioned dithiol compound, as long as the effects of the present invention are not impaired. Examples of the trivalent thiol compound include aliphatic polythiol compounds such as 1,2,3-propanetrithiol, trimethylolpropane tris(2-mercaptoacetate), trimethylolpropane tris(3-mercaptopropionate), trimethylolethane tris(2-mercaptoacetate), trimethylolethane tris(3-mercaptopropionate), 1,2,3-tris(mercaptomethylthio)propane, 1,2,3-tris(2-mercaptoethylthio)propane, 1,2,3-tris(3-mercaptopropylthio) propane, 4-mercaptomethyl-1,8-dimercapto-3,6-dithiaoctane, bis(2,3-dimercaptopropyl) sulfide, an ester of thioglycolic acids and mercaptopropionic acids thereof, tris(mercaptomethylthio)methane, and tris(mercaptoethylthio)methane;

aromatic polythiol compounds such as 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris (mercaptomethyleneoxy)benzene, 1,3,5-tris (mercaptomethyleneoxy)benzene, 1,2,3-tris (mercaptoethyleneoxy)benzene, 1,2,4-tris (mercaptoethyleneoxy)benzene, and 1,3,5-tris (mercaptoethyleneoxy)benzene; and heterocyclic polythiol compounds such as 2,4,6-trimercapto-s-triazine and 2,4,6-trimercapto-1,3,5-triazine.

Examples of the tetravalent thiol compound include tetrakis(mercaptomethyl)methane, pentaerythritol tetrakis(2-mercaptoacetate), pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, 1,1,3,3-tetrakis(mercaptomethylthio)propane, 1,1,2,2-tetrakis(mercaptomethylthio)ethane, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethylethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptoethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, bis(2,3-dimercaptopropyl) sulfide, thioglycolic acid bis(2,3-dimercaptopropylester), thiodipropionic acid bis(2,3-dimercaptopropylester), dithioglycolic acid bis(2,3-dimercaptopropylester), and dithiodipropionic acid bis(2,3-dimercaptopropylester).

It is preferable that the polymerizable composition of the present embodiment includes each component such that a ratio ((b+c)/a) of the total number (b+c) of moles of the hydroxyl group and the mercapto group is 0.70 to 1.30, preferably 0.70 to 1.20, and still more preferably 0.90 to 1.10 with respect to the number "a" of moles of the isocyanato group. Here, "a" is the number of moles of the isocyanato group in the polyisocyanate component (A), "b" is the number of moles of the hydroxyl group in the polyol component (B), and "c" is the number of moles of the mercapto group in the polythiol component (C). In a case where the polymerizable composition of the present embodiment includes each component in the above-mentioned range, the cured product thereof can have excellent impact resistance, and can have transparency and heat resistance.

In the polyol component (B) and the polythiol component (C) included in the polymerizable composition of the present embodiment, a ratio (b/c) of the number "b" of moles of the hydroxyl group to the number "c" of moles of the mercapto group is preferably 0.005 to 0.25 and more preferably 0.025 to 0.100. In a case where the polyol component (B) and the polythiol component (C) are included in the above-mentioned ratio, the obtained cured product of the polymerizable composition has excellent impact resistance and can have transparency and heat resistance.

(Other Components)

The polymerizable composition of the present embodiment may further include, depending on properties desired for the use to be applied, additives such as a polymerization catalyst, an internal release agent, a resin modifier, a light stabilizer, a bluing agent, an ultraviolet absorbing agent, an antioxidant, a coloring inhibitor, a dye, and a photochromic coloring agent.

(Polymerization Catalyst)

The polymerizable composition of the present embodiment may include a polymerization catalyst. Examples of the polymerization catalyst include Lewis acids, tertiary amines, organic acids, and amine organic acid salts, and Lewis acids, amines, and amine organic acid salts are preferable and dimethyltin chloride, dibutyltin dichloride, and dibutyltin laurate are more preferable.

(Internal Release Agent)

The polymerizable composition of the present embodiment may include an internal release agent for the purpose of improving releasability from a mold after molding. An acidic phosphate ester can be used as the internal release agent. Examples of the acidic phosphate ester include a phosphate monoester and a phosphate diester, each of which can be used alone or in combination of two or more thereof. As a commercially available product of the internal release agent, for example, ZelecUN manufactured by Stepan Company, an internal release agent for MR manufactured by Mitsui Chemicals, Inc., JP Series manufactured by JOHOKU CHEMICAL CO., LTD., PHOSPHANOL Series manufactured by TOHO Chemical Industry Co., Ltd., and AP or DP Series manufactured by DAIHACHI CHEMICAL INDUSTRY CO., LTD., can be used.

(Resin Modifier)

The polymerizable composition of the present embodiment may include a resin modifier for the purpose of adjusting various physical properties of the obtained cured product, such as optical properties, impact resistance, and specific gravity, and adjusting viscosity and pot life of the composition. Examples of the resin modifier include an episulfide compound, an alcohol compound other than the above-mentioned polyol compound, an amine compound other than the above-mentioned amine compound, an epoxy compound, an organic acid and an anhydride thereof, and an olefin compound including a (meth)acrylate compound and the like.

(Light Stabilizer)

A hindered amine compound having 2,2,6,6-tetramethylpiperizine skeleton or 1,2,2,6,6-pentamethylpiperizine skeleton can be used as the light stabilizer. Examples of the hindered amine compound include, as a commercially available product, Lowilite 76 and Lowilite 92 manufactured by Chemtura Corporation, Tinuvin 144, Tinuvin 292, and Tinuvin 765 manufactured by BASF, ADK STAB LA-52 and LA-72 manufactured by ADEKA CORPORATION, and JF-95 manufactured by JOHOKU CHEMICAL CO., LTD.

(Bluing Agent)

Examples of the bluing agent include a compound which has an absorption band in a wavelength range from orange to yellow in the visible light range and has a function of adjusting the hue of optical materials formed of resin. More specifically, the bluing agent includes a substance exhibiting blue to purple.

(Ultraviolet Absorbing Agent)

Examples of the ultraviolet absorbing agent include a benzophenone compound, a triazine compound, and a benzotriazole compound.

Examples of the benzophenone-based ultraviolet absorbing agent include 2,2'-dihydroxy-4-methoxybenzophenone, 2-hydroxy-4-acryloyloxybenzophenone, 2-hydroxy-4-acryloyloxy-5-tert-butylbenzophenone, and 2-hydroxy-4-acryloyloxy-2',4'-dichlorobenzophenone.

Examples of the triazine-based ultraviolet absorbing agent include 2-[4-[(2-hydroxy-3-dodecyloxypropyl)oxy]-2-hydroxyphenyl]-4,6-bis(2,4-dimethylphenyl)-1,3,5-triazine, 2-[4-(2-hydroxy-3-tridecyloxypropyl)oxy]-2-hydroxyphenyl]-4,6-bis(2,4dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, and 2-[2-hydroxy-4-(1-octyloxycarbonylethoxy)phenyl]-4,6-bis(4-phenylphenyl)-1,3,5-triazine.

Examples of the benzotriazole-based ultraviolet absorbing agent include 2-(2H-benzotriazol-2-yl)-4-methylphenol, 2-(2H-benzotriazol-2-yl)-4-tert-octylphenol, 2-(2H-benzotriazol-2-yl)-4,6-bis(1-methyl-1-phenylethyl)phenol, 2-(2H-benzotriazol-2-yl)-4,6-di-tert-pentylphenol, 2-(5-chloro-2H-benzotriazol-2-yl)-4-methyl-6-tert-butylphenol, 2-(5-chloro-2H-benzotriazol-2-yl)-2,4-tert-butylphenol, 2,2'-methylenebis[6-(2H-benzotriazol-2-yl)-4-(1,1,3,3-tetramethylbutyl)phenol]. The ultraviolet absorbing agents may be used alone or in combination of two or more thereof.

<Method for Producing Polymerizable Composition for Optical Material>

The polymerizable composition for an optical material of the present embodiment is prepared by using a method of collectively mixing the polyisocyanate component (A), the polyol component (B), and the polythiol component (C), and other components as necessary, or a method of reacting the polyisocyanate component (A) with the polyol component (B) to obtain a prepolymer and then adding and mixing the polythiol component (C) to the prepolymer.

<Cured Product>

A cured product is obtained by polymerizing the polymerizable composition of the present embodiment. The cured product can be obtained in various shapes depending on a shape of a mold. Examples of the polymerization method include a known method in the related art, and the conditions thereof are not particularly limited.

In the present embodiment, a method for producing the cured product is not particularly limited, and preferred examples thereof include cast polymerization. First, a polymerizable composition is injected between a molding mold held by gaskets, tapes, or the like. At this time, depending on physical properties required for the obtained cured product, a degassing treatment under reduced pressure or a filtration treatment such as pressurization or reduced pressure may be preferably performed as necessary.

The polymerization conditions are not limited since the conditions vary depending on the types and amounts of the component (A) to the component (C) used, the type and amount of the catalyst used, and the shape of the mold, but the polymerization is approximately performed at a temperature of −50° C. to 150° C. for 1 to 50 hours. In some cases, it is preferable to maintain at a temperature range of 10° C. to 150° C. or gradually raise the temperature, and then cure the polymerizable composition for 1 to 25 hours.

The cured product of the present embodiment may be subjected to a treatment such as annealing as necessary. The treatment is usually performed at a temperature of 50° C. to 150° C., but preferably 90° C. to 140° C. and more preferably 100° C. to 130° C.

In addition, in the present embodiment, the cured product obtained by heating and curing the polymerizable composition for an optical material can be used, for example, as an optical material or can constitute a part of the optical material. The cured product of the present embodiment is colorless and transparent, has an excellent appearance, has excellent optical properties such as high refractive index and high Abbe number, and has excellent impact resistance and heat resistance. Therefore, the cured product can be used as various optical materials by forming the cured product into a desired shape and providing a coat layer or other members thereon as necessary.

<Optical Material>

Examples of the optical material of the present embodiment include a plastic lens, a camera lens, a lens for light emitting diode, a lens case for light emitting diode, a prism, an optical fiber, an information recording substrate, and a filter. In particular, the cured product is suitable as an optical material such as a plastic lens, a camera lens, lens for light emitting diode and a lens case for light emitting diode, or an optical element.

A plastic lens including the cured product of the present embodiment may be used as a laminated plastic lens by providing a coating layer on one or both surfaces of a lens substrate formed of the cured product as necessary. Examples of the coating layer include a primer layer, a hard coat layer, an anti-reflective coating layer, an antifogging coating layer, an antifouling layer, and a water-repellent layer. Each of the coating layers can be used alone, or a plurality of the coating layers can be used as a multilayer. In a case where coating layers are provided on both surfaces, the same coating layer may be provided on each surface, or different coating layers may be provided.

Each of the coating layers may be used in a combination with an infrared absorbing agent to protect eyes from infrared rays, a light stabilizer or an antioxidant to improve weather resistance of the lens, or a dye or a pigment to enhance fashionability of the lens, and furthermore, other known additives to enhance the performance of the lens, such as a photochromic dye or a photochromic pigment, and an antistatic agent. A hard coat layer, a coat layer such as an anti-reflective coat, or a primer layer may be provided.

For the purpose of fashionability or photochromic properties, the plastic lens including the cured product of the present embodiment may be dyed and used with a coloring matter according to the purpose. The lens can be dyed by a known dyeing method.

In addition, the method for producing the optical material of the present embodiment includes, for example, a step of subjecting the polymerizable composition of the present embodiment to a cast polymerization.

The present disclosure has been described based on the present embodiment, but various configurations can be adopted as long as the effects of the present disclosure are not impaired.

EXAMPLES

Hereinafter, the present invention will be described with reference to Examples and Comparative Examples, but the present invention is not limited thereto. First, evaluation items and evaluation method of a molded product in Examples of the present invention will be described below.

<Evaluation Method>

Transparency (HAZE): a HAZE value of a 2.5 mm-thick plate-shaped cured product was measured using a hazemeter (model number: NDH 2000) manufactured by NIPPON DENSHOKU INDUSTRIES CO., LTD. The result is shown in Table 1 as a numerical value.

Heat resistance (glass transition temperature Tg (° C.)): a test sample of a cured product (2.5 mm-thick) was processed into a size of 5 mm in width and 30 mm in length. Next, dynamic viscoelasticity of the test sample was measured under the conditions of bending mode, distance between chucks of 13 mm, heating rate of 3° C./min, and measurement frequency of 1.0 Hz using a dynamic viscoelasticity measuring device (Dynamic Mechanical Analyzer manufactured by Perkin Elmer Inc., model: DMA8000). A peak temperature of tan δ was calculated as Tg, and the result is shown in Table 1 as a numerical value.

Flexural strength (flexural modulus): a resin flat plate with a thickness of 2.5 mm, a width of 25 mm, and a length of 65 mm was prepared, and an elastic modulus in which a force of 20 N to 30 N was applied to the test piece was obtained from a three-point bending mode using AUTOGRAPH AGS-J manufactured by Shimadzu Corporation.

Impact resistance (IZOD): a resin flat plate (without notch) with a thickness of 2.5 mm, a width of 10.0 mm, and a length of 70.0 mm was produced, and a test was performed using an IZOD impact testing machine (hammer capacity: 40 kgf) manufactured by TOYO SEIKI Co., Ltd. As a result of the test, "A" indicates that the resin flat plate did not break and "B" indicates that the resin flat plate broke, and for the broken resin flat plate, the calculated impact strength was shown.

Impact resistance (puncture test): a four-curve lens with a thickness of 2.5 mm and a diameter of 81 mm was produced, and a test was performed under the following conditions using a high-speed impact testing machine (Shimadzu HYDROSHOT HITS-P-10, manufactured by Shimadzu Corporation).

The puncture point was set to near the intersection of X axis.

Diameter of striker: ½ inch ϕ
Diameter of supporting stand: upper hole: 2.5 inchΦ, lower hole: 40 mmΦ
Test speed: 15 m/s
Test temperature: 23° C.
Fracture type: "B" indicates brittle fracture
"D" indicates ductile fracture In the puncture test, "A" indicates that a displacement at the point of maximum impact force is equal to or more than 15.0 mm, "B" indicates that a displacement at the point of maximum impact force is more than 10.0 mm and less than 15.0 mm, and "C" indicates that a displacement at the point of maximum impact force is equal to or less than 10.0.

Impact resistance (hammer-striking test): for a resin flat plate with a thickness of 2.5 mm on which a Phillips screwdriver is pushed up, "A" indicates that the resin flat plate did not break and a hole with the shape of the Phillips screwdriver was formed, and "B" indicates that the resin was cracked into two or more pieces.

Example 1

0.04 parts by weight of dibutyltin dichloride, 0.12 parts by weight of butoxyethyl acid phosphate (mixture of mono- and di-esters) (manufactured by JOHOKU CHEMICAL CO., LTD., trade name "JP506H"), and 22.39 parts by weight of 1,4-bis(isocyanatomethyl)cyclohexane (manufactured by Mitsui Chemicals, Inc., trade name "FORTIMO", abbreviated as "1,4-H6XDI") were mixed and dissolved to obtain a homogeneous solution. 5.76 parts by weight of polytetramethylene oxide (manufactured by FUJIFILM Wako Pure Chemical Corporation, trade name "polytetramethylene oxide 1,000", abbreviated as "PTMEG 1000") having an average molecular weight of 1000 was added dropwise to the solution, and the reaction was performed at 20° C. for 1 hour. Thereafter, 11.85 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 130° C. and polymerized under the conditions of 130° C. and 5 hours. After the polymerization, the molding mold was taken out of the oven, and a product was released from the molding mold. Releasability was good and no mold peeling was observed.

The evaluation results of the obtained molded product are shown in Table 1.

Example 2

0.065 parts by weight of dibutyltin dichloride, 0.195 parts by weight of butoxyethyl acid phosphate (mixture of mono- and di-esters) (manufactured by JOHOKU CHEMICAL CO., LTD., trade name "JP506H"), 21.14 parts by weight of 1,4-bis(isocyanatomethyl)cyclohexane (1,4-H6XDI) (manufactured by Mitsui Chemicals, Inc., trade name "FORTIMO"), 7.05 parts by weight of 1,3-bis(isocyanatomethyl)cyclohexane (manufactured by Mitsui Chemicals, Inc., trade name "TAKENATE 600", abbreviated as "1,3-H6XDI"), and 9.09 parts by weight of diphenylmethane diisocyanate (abbreviated as "MDI") were mixed and dissolved to obtain a homogeneous solution. 9.07 parts by weight of polytetramethylene oxide (PTMEG 1000) (manufactured by FUJIFILM Wako Pure Chemical Corporation, trade name "polytetramethylene oxide 1,000") having an average molecular weight of 1000 was added dropwise to the solution, and the reaction was performed at 20° C. for 1 hour. Thereafter, 18.65 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 1.

Example 3

0.04 parts by weight of dibutyltin dichloride, 0.12 parts by weight of butoxyethyl acid phosphate (mixture of mono- and di-esters) (manufactured by JOHOKU CHEMICAL CO., LTD., trade name "JP506H"), 11.20 parts by weight of 1,4-bis(isocyanatomethyl)cyclohexane (1,4-H6XDI) (manufactured by Mitsui Chemicals, Inc., trade name "FORTIMO"), and 11.20 parts by weight of 1,3-bis(isocyanatomethyl)cyclohexane (1,3-H6XDI) (manufactured by Mitsui Chemicals, Inc., trade name "TAKENATE 600") were mixed and dissolved to obtain a homogeneous solution. 5.80 parts by weight of polytetramethylene oxide (PTMEG 1000) (manufactured by FUJIFILM Wako Pure Chemical Corporation, trade name "polytetramethylene oxide 1,000") having an average molecular weight of 1000 was added dropwise to the solution, and the reaction was performed at 20° C. for 1 hour. Thereafter, 11.80 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 1.

Example 4

0.03 parts by weight of dibutyltin dichloride, 0.09 parts by weight of butoxyethyl acid phosphate (mixture of mono- and di-esters) (manufactured by JOHOKU CHEMICAL CO., LTD., trade name "JP506H"), 10.26 parts by weight of 1,4-bis(isocyanatomethyl)cyclohexane (1,4-H6XDI) (manufactured by Mitsui Chemicals, Inc., trade name "FORTIMO"), 3.42 parts by weight of 1,3-bis(isocyanatomethyl)cyclohexane (1,3-H6XDI) (manufactured by Mitsui Chemicals, Inc., trade name "TAKENATE 600"), and 4.41 parts by weight of diphenylmethane diisocyanate (MDI) were mixed and dissolved to obtain a homogeneous solution. 2.56 parts by weight of polytetramethylene oxide (manufactured by FUJIFILM Wako Pure Chemical Corporation, trade name "polytetramethylene oxide 650", abbreviated as "PTMEG 650") having an average molecular weight of 650 was added dropwise to the solution, and the reaction was performed at 20° C. for 1 hour. Thereafter, 9.05 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 1.

Example 5

0.03 parts by weight of dibutyltin dichloride, 0.09 parts by weight of butoxyethyl acid phosphate (mixture of mono- and di-esters) (manufactured by JOHOKU CHEMICAL CO., LTD., trade name "JP506H"), 9.24 parts by weight of 1,4-bis(isocyanatomethyl)cyclohexane (1,4-H6XDI) (manufactured by Mitsui Chemicals, Inc., trade name "FORTIMO"), 3.09 parts by weight of 1,3-bis(isocyanatomethyl)cyclohexane (1,3-H6XDI) (manufactured by Mitsui Chemicals, Inc., trade name "TAKENATE 600"), and 3.96 parts by weight of diphenylmethane diisocyanate (MDI) were mixed and dissolved to obtain a homogeneous solution. 5.55 parts by weight of polytetramethylene oxide (manufactured by FUJIFILM Wako Pure Chemical Corporation, trade name "polytetramethylene oxide 1400", abbreviated as "PTMEG 1400") having an average molecular weight of 1400 was added dropwise to the solution, and the reaction was performed at 20° C. for 1 hour. Thereafter, 8.16 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 1.

Example 6

0.05 parts by weight of dibutyltin dichloride, 0.15 parts by weight of butoxyethyl acid phosphate (mixture of mono- and di-esters) (manufactured by JOHOKU CHEMICAL CO., LTD., trade name "JP506H"), 17.14 parts by weight of 1,4-bis(isocyanatomethyl)cyclohexane (1,4-H6XDI) (manufactured by Mitsui Chemicals, Inc., trade name "FORTIMO"), 5.72 parts by weight of 1,3-bis(isocyanatomethyl)cyclohexane (1,3-H6XDI) (manufactured by Mitsui Chemicals, Inc., trade name "TAKENATE 600"), and 7.37 parts by weight of diphenylmethane diisocyanate (MDI) were mixed and dissolved to obtain a homogeneous solution. 3.69 parts by weight of polytetramethylene oxide (PTMEG1000) (manufactured by FUJIFILM Wako Pure Chemical Corporation, trade name "polytetramethylene oxide 1000") having an average molecular weight of 1000 and 0.96 parts by weight of polytetramethylene oxide (manufactured by Sigma-Aldrich Co. LLC, poly(tetrahydrofuran), abbreviated as "PTMEG 250") having an average molecular weight of 250 were added dropwise to the solution, and the reaction was performed at 20° C. for 1 hour. Thereafter, 15.12 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 2.

Example 7

0.05 parts by weight of dibutyltin dichloride, 0.15 parts by weight of butoxyethyl acid phosphate (mixture of mono- and di-esters) (manufactured by JOHOKU CHEMICAL CO., LTD., trade name "JP506H"), 16.67 parts by weight of 1,4-bis(isocyanatomethyl)cyclohexane (1,4-H6XDI) (manufactured by Mitsui Chemicals, Inc., trade name "FORTIMO"), 5.56 parts by weight of 1,3-bis(isocyanatomethyl)cyclohexane (1,3-H6XDI) (manufactured by Mitsui Chemicals, Inc., trade name "TAKENATE 600"), and 7.16 parts by weight of diphenylmethane diisocyanate (MDI) were mixed and dissolved to obtain a homogeneous solution. 4.97 parts by weight of polytetramethylene oxide (PTMEG 1400) (manufactured by FUJIFILM Wako Pure Chemical Corporation, trade name "polytetramethylene oxide 1400") having an average molecular weight of 1400 and 0.94 parts by weight of polytetramethylene oxide (PTMEG 250) (manufactured by Sigma-Aldrich Co. LLC, poly(tetrahydrofuran)) having an average molecular weight of 250 were added dropwise to the solution, and the reaction was performed at 20° C. for 1 hour. Thereafter, 14.71 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 2.

Comparative Example 1

0.03 parts by weight of dibutyltin dichloride, 0.09 parts by weight of butoxyethyl acid phosphate (mixture of mono- and di-esters) (manufactured by JOHOKU CHEMICAL CO., LTD., trade name "JP506H"), and 18.84 parts by weight of 1,4-bis(isocyanatomethyl)cyclohexane (1,4-H6XDI) (manufactured by Mitsui Chemicals, Inc., trade name "FORTIMO") were mixed and dissolved to obtain a homogeneous solution. 1.20 parts by weight of polytetramethylene oxide (PTMEG 250) (manufactured by Sigma-Aldrich Co. LLC, poly(tetrahydrofuran)) having an average molecular weight of 250 was added dropwise to the solution, and the reaction was performed at 20° C. for 1 hour. Thereafter, 9.96 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 130° C. and polymerized under the conditions of 130° C. and 5 hours. After the polymerization, the molding mold was taken out of the oven, and a product was released from the molding mold. Releasability was good and no mold peeling was observed.

The evaluation results of the obtained molded product are shown in Table 3.

Comparative Example 2

0.03 parts by weight of dibutyltin dichloride, 0.09 parts by weight of butoxyethyl acid phosphate (mixture of mono- and di-esters) (manufactured by JOHOKU CHEMICAL CO., LTD., trade name "JP506H"), 8.25 parts by weight of 1,4-bis(isocyanatomethyl)cyclohexane (1,4-H6XDI) (manufactured by Mitsui Chemicals, Inc., trade name "FORTIMO"), and 8.25 parts by weight of 1,3-bis(isocyanatomethyl)cyclohexane (1,3-H6XDI) (manufactured by Mitsui Chemicals, Inc., trade name "TAKENATE 600") were mixed and dissolved to obtain a homogeneous solution. 1.05 parts by weight of polytetramethylene oxide (PTMEG 250) (manufactured by Sigma-Aldrich Co. LLC, poly(tetrahydrofuran)) having an average molecular weight of 250 was added dropwise to the solution, and the reaction was performed at 20° C. for 1 hour. Thereafter, 12.45 parts by weight of bis(2-mercaptoethyl) sulfide (MES) (manufactured by Maruzen Petrochemical Co., Ltd.) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 4 hours. After the polymerization, the molding mold was taken out of the oven, and a product was released from the molding mold. Releasability was good and no mold peeling was observed.

The evaluation results of the obtained molded product are shown in Table 3.

Comparative Example 3

0.03 parts by weight of dibutyltin dichloride, 0.09 parts by weight of butoxyethyl acid phosphate (mixture of mono- and di-esters) (manufactured by JOHOKU CHEMICAL CO., LTD., trade name "JP506H"), and 16.80 parts by weight of 1,3-bis(isocyanatomethyl)cyclohexane (1,3-H6XDI) (manufactured by Mitsui Chemicals, Inc., trade name "TAKENATE 600") were mixed and dissolved to obtain a homogeneous solution. 4.32 parts by weight of polytetramethylene oxide (PTMEG 1000) (manufactured by FUJIFILM Wako Pure Chemical Corporation, trade name "polytetramethylene oxide 1000") having an average molecular weight of 1000 was added dropwise to the solution, and the reaction was performed at 20° C. for 1 hour. Thereafter, 8.88 parts by weight of 1,3-propane dithiol (manufactured by FUJIFILM Wako Pure Chemical Corporation) was mixed with the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 3.

Comparative Example 4

0.05 parts by weight of dibutyltin dichloride, 0.15 parts by weight of butoxyethyl acid phosphate (mixture of mono- and di-esters) (manufactured by JOHOKU CHEMICAL CO., LTD., trade name "JP506H"), and 24.12 parts by weight of 1,4-bis(isocyanatomethyl)cyclohexane (1,4-H6XDI) (manufactured by Mitsui Chemicals, Inc., trade name "FORTIMO") were mixed and dissolved to obtain a homogeneous solution. 5.22 parts by weight of polytetramethylene oxide (PTMEG 1000) (manufactured by FUJIFILM Wako Pure Chemical Corporation, trade name "polytetramethylene oxide 1000") having an average molecular weight of 1000 was added dropwise to the solution, and the reaction was performed at 20° C. for 1 hour. Thereafter, 20.66 parts by weight of 4-mercaptomethyl-1,8-dimercapto-3,6-dithiaoctane (GST) was mixed to the solution to obtain a homogeneous solution. The solution was cooled to 0° C., degassed at 400 Pa for 30 minutes, and injected into a molding mold. The molding mold was put into an oven heated to 100° C. and polymerized under the conditions of 100° C. and 24 hours. After the polymerization, the molding mold was taken out of the oven, and a product was released from the molding mold. Releasability was good and no mold peeling was observed.

The evaluation results of the obtained molded product are shown in Table 3.

TABLE 1

|  |  | Example 1 | Example 2 | Example 3 | Example 4 | Example 5 |
|---|---|---|---|---|---|---|
| Isocyanate | 1,4-H6XDI [mol %] | 50 | 30 | 25 | 30 | 30 |
|  | 1,3-H6XDI [mol %] | — | 10 | 25 | 10 | 10 |

TABLE 1-continued

|  |  | Example 1 | Example 2 | Example 3 | Example 4 | Example 5 |
|---|---|---|---|---|---|---|
|  | MDI [mol %] | — | 10 | — | 10 | 10 |
| PTMEG (Mw) | PTMEG 250 [mol %] | — | — | — | — | — |
|  | PTMEG 650 [mol %] | — | — | — | 2.5 | — |
|  | PTMEG 1000 [mol %] | 2.5 | 2.5 | 2.5 | — | — |
|  | PTMEG 1400 [mol %] | — | — | — | — | 2.5 |
| Thiol | 1,3-propane dithiol [mol %] | 47.5 | 47.5 | 47.5 | 47.5 | 47.5 |
| Curing temperature [° C.] |  | 130 | 100 | 100 | 100 | 100 |
| Refractive index nd |  | 1.568 | 1.586 | 1.568 | 1.593 | 1.580 |
| Haze |  | 22.1 | 7.6 | 9.4 | 0.6 | 0.3 |
| Heat resistance Tg [° C.] |  | 77.5 | 83.0 | 76.2 | 86.0 | 79.2 |
| Flexural modulus [N/mm$^2$] |  | 2450 | 2283 | 2383 | 2622 | 1884 |
| IZOD impact test |  | A | A | A | A | A |
| Hammer-striking test |  | A | A | A | A | A |
| Puncture test | Center thickness [mm] | 1.85 | 1.92 | 1.86 | 1.88 | 1.88 |
|  | Maximum impact force [kN] | 3.4 | 3.9 | 2.6 | 3.6 | 2.6 |
|  | Point of maximum impact force displacement [mm] | 16.1 | 17.4 | 14.9 | 14.9 | 16.2 |
|  | Point of maximum impact force energy [J] | 20.9 | 26.6 | 12.4 | 19.8 | 14.5 |
|  | Point of puncture displacement [mm] | 22.1 | 23.4 | 19.4 | 19.8 | 25.0 |
|  | Point of puncture energy [J] | 36.1 | 44.2 | 16.9 | 29.6 | 31.1 |
|  | Fracture type | D or B | D | B | B or D | D |
|  | Judgement | A | A | B | B | A |

TABLE 2

|  |  | Example 6 | Example 7 |
|---|---|---|---|
| Isocyanate | 1,4-H6XDI [mol %] | 30 | 30 |
|  | 1,3-H6XDI [mol %] | 10 | 10 |
|  | MDI [mol %] | 10 | 10 |
| PTMEG (Mw) | PTMEG 250 [mol %] | 1.25 | 1.25 |
|  | PTMEG 650 [mol %] | — | — |
|  | PTMEG 1000 [mol %] | 1.25 | — |
|  | PTMEG 1400 [mol %] | — | 1.25 |
| Thiol | 1,3-propane dithiol [mol %] | 47.5 | 47.5 |
| Curing temperature [° C.] |  | 100 | 100 |
| Refractive index nd |  | 1.593 | 1.589 |
| Haze |  | 12.5 | 14.7 |
| Heat resistance Tg [° C.] |  | 84.9 | 84.8 |
| Flexural modulus [N/mm$^2$] |  | 2783 | 2610 |
| IZOD impact test |  | A | A |
| Hammer-striking test |  | A | A |
| Puncture test | Center thickness [mm] | 1.85 | 1.86 |
|  | Maximum impact force [kN] | 4.0 | 3.9 |
|  | Point of maximum impact force displacement [mm] | 17.1 | 17.3 |
|  | Point of maximum impact force energy [J] | 27.0 | 27.2 |
|  | Point of puncture displacement [mm] | 23.0 | 23.4 |
|  | Point of puncture energy [J] | 44.2 | 44.5 |
|  | Fracture type | D | D |
|  | Judgement | A | A |

TABLE 3

|  |  | Comparative Example 1 | Comparative Example 2 | Comparative Example 3 | Comparative Example 4 |
|---|---|---|---|---|---|
| Isocyanate | 1,4-H6XDI [mol %] | 50 | 25 | — | 59.5 |
|  | 1,3-H6XDI [mol %] | — | 25 | 50 | — |
| PTMEG (Mw) | PTMEG 250 [mol %] | 2.5 | 2.5 | — | — |
|  | PTMEG 1000 [mol %] | — | — | 2.5 | 2.5 |
| Thiol | 1,3-propane dithiol [mol %] | 47.5 | — | 47.5 | — |
|  | MES [mol %] | — | 47.5 | — | — |
|  | GST [mol %] | — | — | — | 38.0 |
| Curing temperature [° C.] |  | 100 | 100 | 100 | 100 |
| Refractive index nd |  | 1.579 | 1.598 | 1.569 | N.A |
| Haze |  | 6.8 | 2.8 | 8.6 | 97.6 |
| Tg [° C.] |  | 91.0 | 74.8 | 74.2 | 90.7 |
| Flexural modulus [N/mm$^2$] |  | 2521 | 2752 | 2342 | 2405 |
| IZOD impact test [kJ/m$^2$] |  | B 123 | B 61.2 | B 92 | A 133 |

TABLE 3-continued

| | | Comparative Example 1 | Comparative Example 2 | Comparative Example 3 | Comparative Example 4 |
|---|---|---|---|---|---|
| Hammer-striking test | | B | B | B | B |
| Puncture energy [J] | Center thickness [mm] | 1.8 | 1.8 | 1.9 | 1.9 |
| | Maximum impact force [kN] | 0.2 | 0.4 | 2.6 | 2.8 |
| | Point of maximum impact force displacement [mm] | 2.0 | 7.0 | 13.2 | 12.9 |
| | Point of maximum impact force energy [J] | 0.2 | 1.8 | 13.1 | 9.1 |
| | Point of puncture displacement [mm] | 7.5 | 9.2 | 18.9 | 15.3 |
| | Point of puncture energy [J] | 0.8 | 2.3 | 25.2 | 12.5 |
| | Fracture type | B | B | B | B |
| | Judgement | C | C | B | B |

It is apparent that the present invention is not limited to the above embodiment, and may be modified and changed without departing from the scope and spirit of the invention.

What is claimed is:

1. A polymerizable composition for an optical material, comprising:
   a polyisocyanate component which includes 1,4-bis(isocyanatomethyl)cyclohexane;
   a polyol component which includes a diol compound having a molecular weight of 400 or more and having two hydroxyl groups; and
   a polythiol component which includes a dithiol compound having two mercapto groups,
      wherein a ratio (b/c) of a number "b" of moles of the hydroxyl group of the polyol component to a number "c" of moles of the mercapto group of the polythiol component is 0.005 to 0.25, and
   wherein an amount of 1,4-bis(isocyanatomethyl)cyclohexane with respect to a whole polyisocyanate component is 20 mol % or more and 80 mol % or less.

2. The polymerizable composition for an optical material according to claim 1,
   wherein the diol compound having a molecular weight of 400 or more and having two hydroxyl groups includes a polyether diol.

3. The polymerizable composition for an optical material according to claim 2,
   wherein the polyether diol includes polytetramethylene ether glycol.

4. The polymerizable composition for an optical material according to claim 1,
   wherein the 1,4-bis(isocyanatomethyl)cyclohexane contains a trans-isomer at a proportion of 70 mol % to 99 mol %.

5. The polymerizable composition for an optical material according to claim 1,
   wherein the polyisocyanate component further includes an aromatic polyisocyanate compound having two or more isocyanato groups.

6. The polymerizable composition for an optical material according to claim 5,
   wherein the aromatic polyisocyanate compound includes at least one selected from the group consisting of 4,4'-diphenylmethane diisocyanate, 2,4'-diphenylmethane diisocyanate, and 2,2'-diphenylmethane diisocyanate.

7. The polymerizable composition for an optical material according to claim 1,
   wherein the dithiol compound includes at least one selected from the group consisting of 1,3-propane dithiol and bis(2-mercaptoethyl) sulfide.

8. The polymerizable composition for an optical material according to claim 1,
   wherein the polyisocyanate component and the polyol component form a prepolymer.

9. A molded product formed of a cured product of the polymerizable composition for an optical material according to claim 1.

10. An optical material formed of the molded product according to claim 9.

11. A plastic lens formed of the molded product according to claim 9.

12. A laminated plastic lens including:
    the plastic lens according to claim 11; and
    a hard coat layer and an anti-reflective coating layer which are provided on at least one surface of the plastic lens.

* * * * *